US 11,897,330 B2

(12) United States Patent
Yoshida et al.

(10) Patent No.: US 11,897,330 B2
(45) Date of Patent: *Feb. 13, 2024

(54) ACCELERATOR PEDAL SYSTEM

(71) Applicant: DENSO CORPORATION, Kariya (JP)

(72) Inventors: Yuusuke Yoshida, Kariya (JP); Soichi Kinouchi, Kariya (JP); Hideyuki Mori, Kariya (JP); Takuto Kita, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,618

(22) Filed: Aug. 23, 2022

(65) Prior Publication Data

US 2023/0066123 A1 Mar. 2, 2023

(30) Foreign Application Priority Data

Aug. 25, 2021 (JP) .................................. 2021-137324

(51) Int. Cl.
*G05G 1/30* (2008.04)
*B60K 26/02* (2006.01)
(Continued)

(52) U.S. Cl.
CPC ............ *B60K 26/02* (2013.01); *B60K 26/021* (2013.01); *G05G 1/44* (2013.01);
(Continued)

(58) Field of Classification Search
CPC ............ G05G 1/30; G05G 1/40; G05G 1/405; G05G 1/38; G05G 1/44; G05G 5/005;
(Continued)

(56) References Cited

U.S. PATENT DOCUMENTS

2017/0217312 A1* 8/2017 Schweinfurth ......... F02D 11/02
2019/0322172 A1* 10/2019 O Meachair ........ B60W 30/143

FOREIGN PATENT DOCUMENTS

DE    102019133970 A1 * 6/2021 ............ B60W 30/06
EP       2196348 A1 * 6/2010 ........... B60K 26/021
(Continued)

OTHER PUBLICATIONS

"What is Highway Driving Assist and How Does It Work," Christian Wardlaw, Published Feb. 1, 2021 on JD Power.com, url :<https://www.jdpower.com/cars/shopping-guides/what-is-highway-driving-assist-and-how-does-it-work>.*
(Continued)

*Primary Examiner* — Daniel D Yabut
*Assistant Examiner* — Brian J McGovern
(74) *Attorney, Agent, or Firm* — Nixon & Vanderhye P.C.

(57) ABSTRACT

An accelerator pedal system includes a pedal lever, a lock mechanism, an actuator, and an ECU. The pedal lever operates in accordance with a step-on operation. The lock mechanism is capable of restricting the operation of the pedal lever. The lock mechanism can switch a locked state in which the operation of the pedal lever is restricted by the lock mechanism and an unlocked state in which the operation of the pedal lever is free from restriction by the lock mechanism. The ECU includes a locking operation determination unit, an actuator control unit, and an information acquisition unit. The locking operation determination unit determines switching of a locking operation by the lock mechanism. The actuator control unit controls a driving operation of an actuator. The locking operation determination unit locks the pedal lever when the vehicle is traveling on a specific position in an automatic driving mode.

7 Claims, 7 Drawing Sheets

(51) Int. Cl.
  *G05G 1/44* (2008.04)
  *G05G 5/00* (2006.01)
  *G05G 5/03* (2008.04)

(52) U.S. Cl.
  CPC .......... *B60K 2026/023* (2013.01); *G05G 1/30* (2013.01); *G05G 5/005* (2013.01); *G05G 5/03* (2013.01)

(58) Field of Classification Search
  CPC ... G05G 5/03; G05G 5/05; G05G 5/28; B60K 26/02; B60K 26/021; B60K 2026/023; B60K 2026/022; B60K 2026/026; B60K 28/02; B60W 30/14; B60W 30/143; B60W 50/16; B60W 2540/10
  See application file for complete search history.

(56) References Cited

FOREIGN PATENT DOCUMENTS

| EP | 2384921 | 11/2011 | |
|----|---------|---------|----|
| EP | 3747720 A1 * | 12/2020 | .......... B60W 50/082 |

OTHER PUBLICATIONS

Machine Translation of EP-2196348-A1.*
Machine Translation of DE-102019133970-A1.*
Machine Translation of EP-3747720-A1.*
"Adaptive cruise control," Wikipedia Page, dated by Wayback Machine to Dec. 11, 2019, url:<https://web.archive.org/web/20191211064623/https://en.wikipedia.org/wiki/Adaptive_cruise_control>.*
U.S. Appl. No. 17/893,637 to Yuusuke Yoshida, filed Aug. 23, 2022 (34 pages).
U.S. Appl. No. 17/893,668 to Yuusuke Yoshida, filed Aug. 23, 2022 (22 pages).
U.S. Appl. No. 17/893,700 to Soichi Kinouchi, filed Aug. 23, 2022 (24 pages).
U.S. Appl. No. 17/893,752 to Soichi Kinouchi, filed Aug. 23, 2022 (22 pages).
U.S. Appl. No. 17/893,801 to Soichi Kinouchi, filed Aug. 23, 2022 (25 pages).
U.S. Appl. No. 17/893,842 to Soichi Kinouchi, filed Aug. 23, 2022 (33 pages).
U.S. Appl. No. 17/893,883 to Soichi Kinouchi, filed Aug. 23, 2022 (28 pages).

* cited by examiner

ACCELERATOR PEDAL SYSTEM

CROSS REFERENCE TO RELATED APPLICATION

The present application is based on and claims the benefit of priority of Japanese Patent Application No. 2021-137324, filed on Aug. 25, 2021, the disclosure of which is incorporated herein by reference.

TECHNICAL FIELD

The present disclosure relates to an accelerator pedal system.

BACKGROUND

Conventionally, there is a known system that has a cruise control function for maintaining a constant traveling speed of a vehicle. For example, when a vehicle is in a cruise control mode, a pedal device generates a force necessary to hold a pedal, so that the pedal functions as a footrest.

In a case where the cruise control mode is used in an urban area or the like, there are many chances that a pedal needs to be operated depending on a surrounding traffic situation as compared with a case where the vehicle is driven/operated on a limited highway. Therefore, when the pedal is made to serve as a footrest in the cruise control mode in a situation where there are many chances of operating the pedal, for example, in an urban area, the number of times of releasing the footrest state increases, and an increasing burden of operation can be placed on the driver.

SUMMARY

It is an object of the present disclosure to provide an accelerator pedal system capable of appropriately controlling a state of locking (i.e., locked state) of a pedal lever.

An accelerator pedal system of the present disclosure includes a pedal lever configured to perform an operation in accordance with a step-on operation, a lock mechanism configured to be capable of restricting the operation of the pedal lever, an actuator configured to switch between a locked state in which the operation of the pedal lever is restricted by the lock mechanism and an unlocked state in which the operation of the pedal lever is free from restriction by the lock mechanism, and a controller.

The controller includes a locking operation determination unit configured to determine switching of a locking operation by the lock mechanism, an actuator control unit configured to control a drive of the actuator, and an information acquisition unit configured to acquire position information of the vehicle. The locking operation determination unit locks the pedal lever when a vehicle is traveling on a specific position in an automatic driving mode. Thus, it is possible to appropriately control a locked state of the pedal lever.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Hereinafter, an accelerator pedal system according to the present disclosure will be described with reference to the drawings. In a plurality of embodiments, substantially the same components are denoted by the same reference signs, and the description thereof is omitted.

First Embodiment

Figure 1:
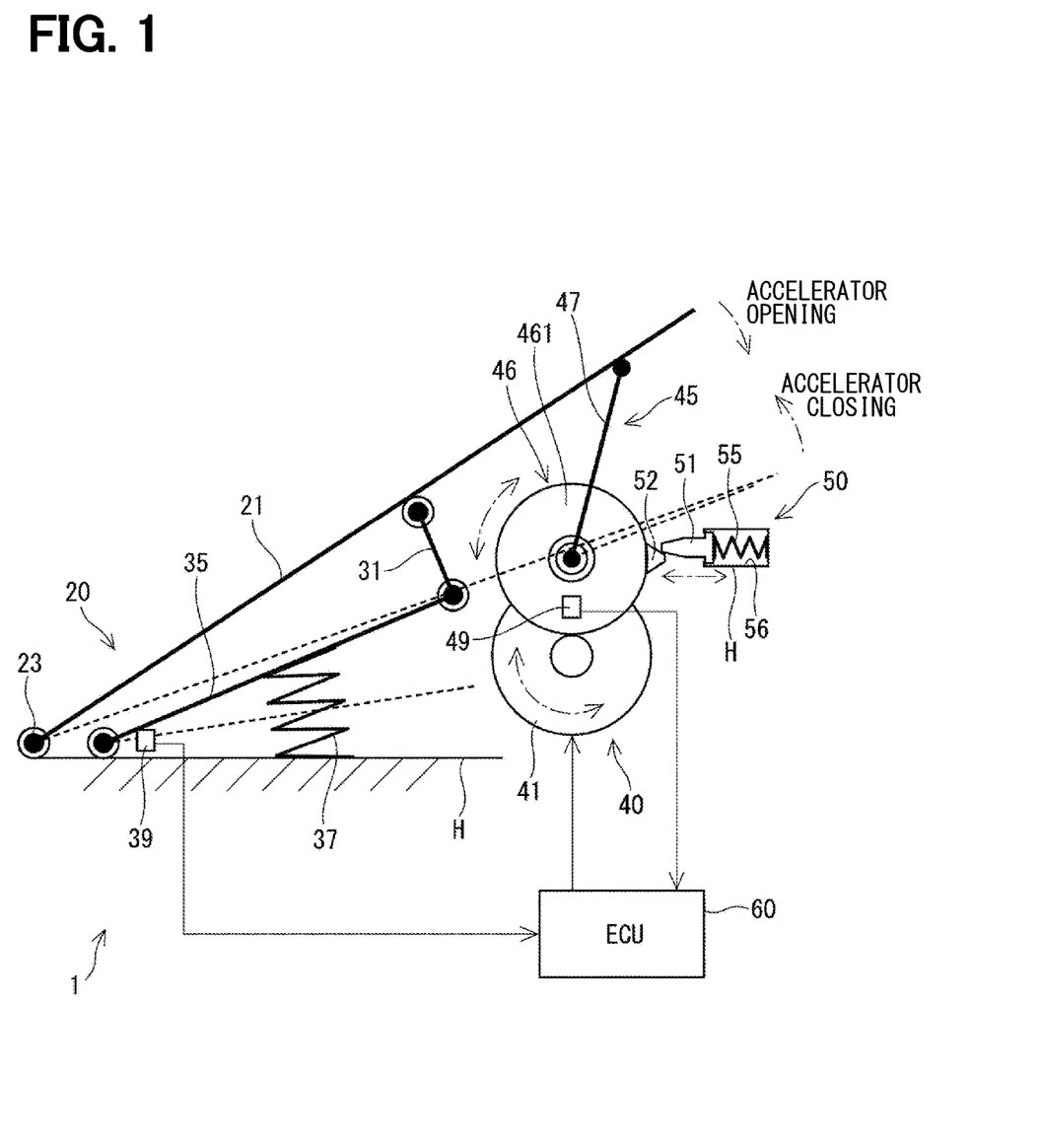
FIG. 1 is a schematic diagram illustrating an accelerator pedal system according to a first embodiment.

The first embodiment is illustrated in FIGS. 1 to 6. As illustrated in FIG. 1, an accelerator pedal system 1 includes a pedal lever 20, an actuator 40, a power transmission mechanism 45, a lock mechanism 50, an electronic control unit (ECU) 60 serving as a controller, and the like.

The pedal lever 20 includes a pad 21, an arm 31, and a pedal 35, and is integrally driven by a driver's step-on operation or the like. The pad 21 is provided to be operable by a driver's step-on operation. The pad 21 is rotatably supported by a fulcrum member 23 provided on a housing H. FIG. 1 illustrates a so-called floor type (organ type) pedal in which the pad 21 is provided to extend in a direction along one surface of the housing H. However, a suspension type (pendant type) pedal may be used. In the present embodiment, the housing portions such as a pedal housing and a motor housing that are not driven by driving of a motor 41 or a step-on operation of the pedal lever 20 are collectively referred to as a "housing H."

The arm 31 couples the pad 21 and the pedal 35. One end of the pedal 35 is rotatably supported by the housing H, and the other end of the pedal 35 is connected to the arm 31. With such an arrangement, the pad 21, the arm 31, and the pedal 35 are integrally driven by an operation of the pad 21 by the driver. A pedal opening degree sensor 39 that detects a pedal opening degree θ is provided on one end of the pedal 35.

Figure 2:
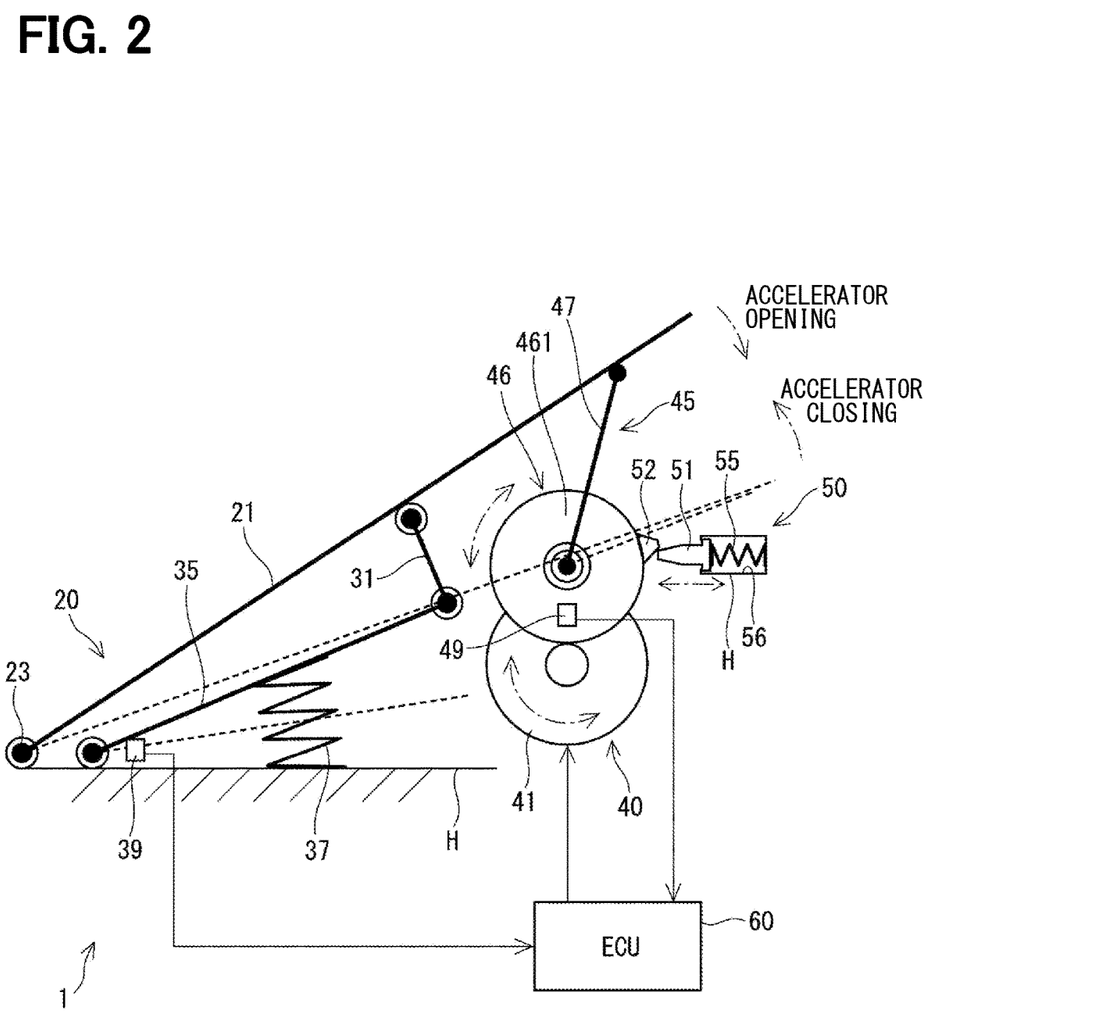
FIG. 2 is a schematic diagram illustrating a state where a pedal lever is locked in the accelerator pedal system according to the first embodiment.

A pedal biasing member 37 is a compression coil spring and biases the pedal 35 in an accelerator closing direction, with one end fixed to the pedal 35 and the other end fixed to the housing H. In FIGS. 1 and 2, the solid lines depict a state of fully closed acceleration, and the broken lines depict a state of fully opened acceleration.

The actuator 40 includes the motor 41 and a power transmission mechanism 45. The motor 41 is, for example, a direct current (DC) motor, and driving of the motor 41 is controlled by the ECU 60. The driving force of the motor 41 is transmitted to the pedal lever 20 via the power transmission mechanism 45. It can be said that the actuator 40 is a series of components that transmits power from the motor 41 as a drive source to the pedal lever 20 via the power transmission mechanism 45.

The power transmission mechanism 45 includes a gear set 46, a power transmission member 47, and the like. The gear set 46 is configured with: a motor gear that rotates integrally with a motor shaft; and a plurality of gears that mesh with the motor gear, and the gear set 46 transmits the driving force of the motor 41 to the power transmission member 47. The gear set 46 includes a gear 461 that is provided with a locked portion 52 to be locked as described later. The gear 461 is provided with a position sensor 49 that detects a rotational position. Hereinafter, the rotational directions of the motor 41, the gear 461, and the like when the gear 461 is rotated counterclockwise on the paper surface are defined as positive, and the rotational directions of the motor 41, the gear 461, and the like when the gear 461 is rotated clockwise on the paper surface are defined as negative.

The power transmission member 47 is, for example, a cam, and one end side of the power transmission member 47 meshes with the gear set 46, so that the power transmission member 47 is rotationally driven by driving of the motor 41. The other end side of the power transmission member 47 is in contact with the pedal lever 20. With this arrangement, the driving force of the motor 41 is transmitted to the pedal lever 20. In FIG. 1, the other end of the power transmission member 47 is in contact with the pad 21, but may be in contact with the arm 31 or the pedal 35.

By rotating the motor 41 in the positive direction in a state where the power transmission member 47 and the pedal lever 20 are in contact with each other, it is possible to apply a reaction force in a push-back direction to the pedal lever 20. In addition, when no reaction force is applied to the pedal lever 20, it is desirable to rotate the motor 41 in the negative direction and thereby to retract the power transmission member 47 so that the pedal lever 20 and the power transmission member 47 will not be in contact with each other in the entire range from the fully closed state to the fully opened state of the pedal lever 20. Therefore, when no reaction force is applied, it is possible to prevent a cogging torque or the like from the power transmission mechanism 45 side from affecting a pedal force.

By applying a reaction force in the push-back direction to the pedal lever 20 by the motor 41, for example, by applying a reaction force to provide a sense of wall when a fuel consumption is determined, on the basis of the driving situation, to be deteriorated if the pad 21 is stepped on, the stepping on of the pad 21 by the driver is prevented or reduced. Accordingly, a fuel efficiency can be improved. Further, for example, by pulse-driving the pedal lever 20 in the push-back direction, the pulse-driving can be used to transmit information such as notification of switching from automatic driving to manual driving.

The lock mechanism 50 includes a locking member 51, a locked portion 52 to be locked, a resilient member 55, and the like. The locking member 51 has a tapered surface formed on one end side of the locking member 51 and is disposed such that the tapered surface is in contact with the locked portion 52. The other end side of the locking member 51 is accommodated in an accommodation chamber 56 formed on the housing H and is provided to be reciprocally movable in the axial direction. The locked portion 52 is provided to protrude from the gear 461 constituting the gear set 46, and rotates integrally with the gear 461. The locked portion 52 comes into contact with the locking member 51 on the tapered surface.

The resilient member 55 is accommodated in the accommodation chamber 56 provided on the housing H. One end of the resilient member 55 is in contact with the locking member 51, and the other end is engaged with the housing H, whereby the resilient member 55 biases the locking member 51 toward the locked portion 52.

FIG. 1 illustrates a state when locking is just started. When the gear 461 is rotated counterclockwise on the paper surface by the driving force of the motor 41 in a state where the locked portion 52 and the locking member 51 are in contact with each other, the locked portion 52 pushes the locking member 51 and thereby compresses the resilient member 55. When the gear 461 is further rotated counterclockwise and the locked portion 52 goes over and gets around the locking member 51 to the upper side on the paper surface, the locking member 51 returns to an initial position by the biasing force of the resilient member 55.

As illustrated in FIG. 2, in a locked state, since the locking member 51 latches the locked portion 52 by the biasing force of the resilient member 55, the rotation of the gear 461 is restricted. In addition, the power transmission member 47 functions as a locking force transmission member, so that the operation of the pedal lever 20 is restricted. As a result, the operation of the pedal lever 20 can be restricted in a non-energized state in which the energization of the motor 41 is turned off.

Hereinafter, to restrict the operation of the pedal lever 20 is simply referred to as "to lock". For example, during automatic driving or the like, it is possible to secure comfort by locking the pedal lever 20 and by thus making the pad 21 function as a footrest. In the present embodiment, the description is given, assuming that the pedal lever 20 is locked at a fully closed position.

When the gear 461 is rotated clockwise on the paper surface from the locked state illustrated in FIG. 2 by the driving force of the motor 41, the locked portion 52 pushes the locking member 51, so that the resilient member 55 is compressed. When the locked portion 52 goes over and gets around the locking member 51 to the lower side on the paper surface, the locked state is released, so that the locking member 51 returns to the initial position by the biasing force of the resilient member 55. Also, when a predetermined pedal force or more pedal force is applied to the pedal lever 20, the locked state can be similarly released.

When the pedal lever 20 is kept unlocked, it is desirable to further rotate the gear 461 clockwise from the state illustrated in FIG. 1 to retract the locked portion 52 so that the locking member 51 and the locked portion 52 will not come into contact with each other.

Figure 3:
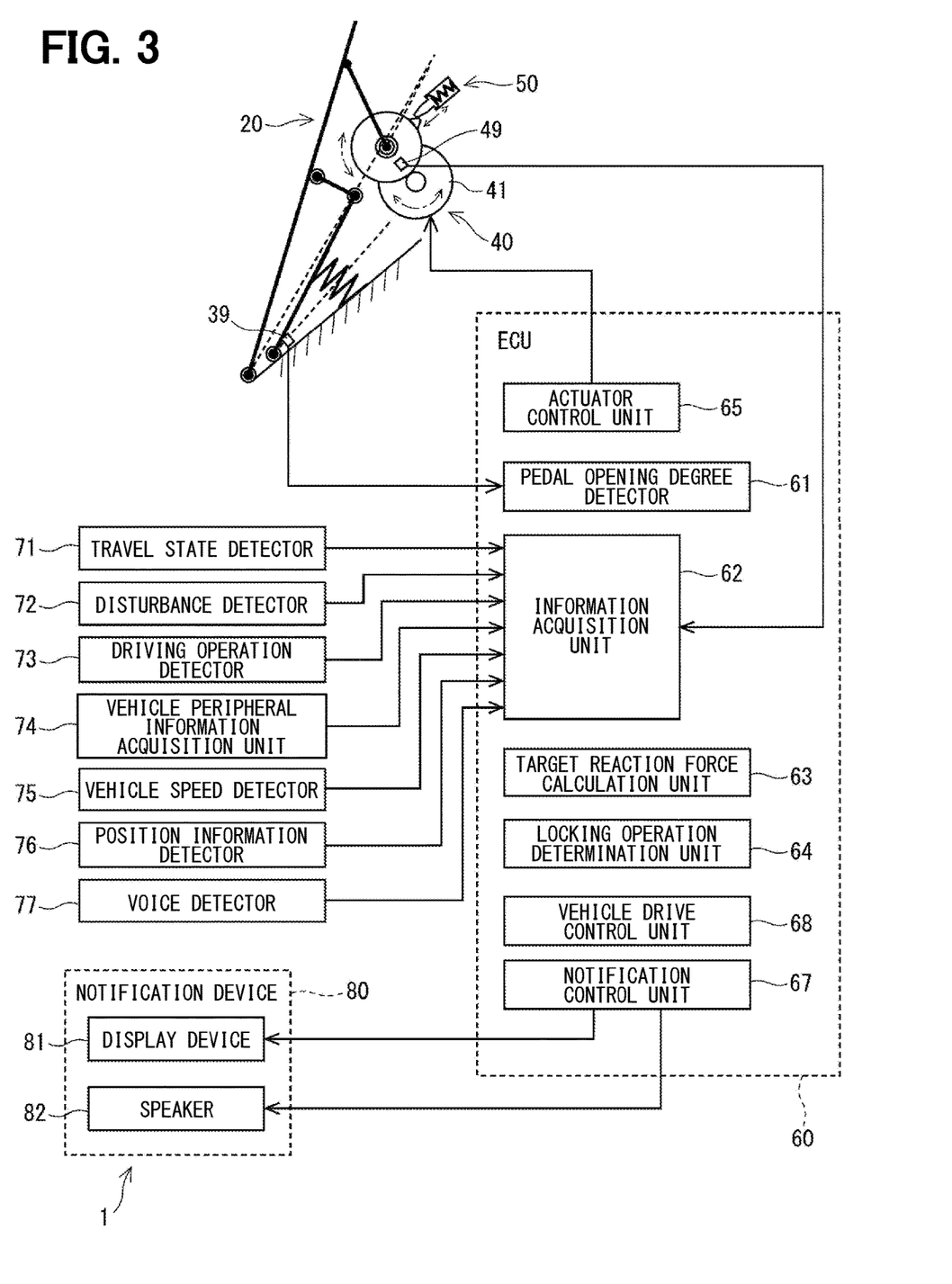
FIG. 3 is a block diagram illustrating a control configuration of the accelerator pedal system according to the first embodiment.

As illustrated in FIG. 3, the ECU 60 is mainly configured with a microcomputer or the like, and includes therein: a central processing unit (CPU), a read-only memory (ROM), a random-access memory (RAM), an input/output interface (I/O), which are all not illustrated; a bus line that connects these components; and other components. Processes in the ECU 60 may be realized by software processing that is performed by the CPU executing a program previously stored in a physical memory device such as a ROM or the like (that is, a readable non-transitory tangible recording medium), and the processes may be realized by hardware processing performed by a dedicated electronic circuit.

The ECU 60 includes, as functional blocks: a pedal opening degree detector 61; an information acquisition unit 62; a target reaction force calculation unit 63; a locking operation determination unit 64; an actuator control unit 65; a notification control unit 67; a vehicle drive control unit 68; and the like. Although the ECU 60 is depicted as a single ECU 60 in FIG. 3, some of the functions may be configured with a separate ECU or the like.

The pedal opening degree detector 61 detects the pedal opening degree θ on the basis of a detection value of the pedal opening degree sensor 39. The information acquisition unit 62 acquires various types of information from the following components: the position sensor 49, a travel state detector 71, a disturbance detector 72, a driving operation detector 73, a vehicle peripheral information acquisition unit 74, a vehicle speed detector 75, a position information detector 76, a voice detector 77, and the like.

The target reaction force calculation unit 63 calculates a target reaction force to be applied to the pedal lever 20. On the basis of various types of information acquired by the information acquisition unit 62, the locking operation determination unit 64 makes a determination related to switching between a locked state in which the pedal lever 20 is locked and an unlocked state in which the pedal lever 20 is not locked. Hereinafter, as appropriate, switching from the unlocked state to the locked state is referred to as "lock activation," and switching from the locked state to the unlocked state is referred to as "lock releasing." The actuator control unit 65 controls driving of the motor 41 on the basis of the target reaction force, a determination result of the locking operation determination unit 64, and the like.

The notification control unit 67 notifies a notification device 80 of information that the driver is to be notified of. In the present embodiment, information related to lock activation and lock releasing of the pedal lever 20 is notified of. The vehicle drive control unit 68 controls driving of the vehicle.

The travel state detector 71 detects a driving mode as a traveling state. The driving mode includes an override mode in addition to an automatic driving mode and a manual driving mode. The control in the automatic driving mode is a cruise control such as an adaptive cruise control (ACC), but details of the control does not matter. In the override mode, both an input from the control by the automatic driving and a step-on input from the driver are input, and the input by the step-on operation of the driver is always prioritized in the override mode.

The disturbance detector 72 detects a disturbance on the basis of information of a G sensor that detects acceleration, a suspension behavior detection device, an indoor camera, and the like. The disturbance includes, for example, a vehicle deceleration G caused by a relatively rapid deceleration, a vehicle vibration caused by a stepped road surface and the like. Further, the disturbance may include non-driving-operation motions that are motions other than normal driving motions, for example, reseating of the driver, wearing and removing the seat belt, picking up a fallen object, stretching, and a driver's state of consciousness.

The driving operation detector 73 detects a turn signal operation and a steering wheel manipulation by the driver. The vehicle peripheral information acquisition unit 74 detects oncoming other vehicles, obstacles, and the like by road-to-vehicle communication, vehicle-to-vehicle communication, an onboard camera, radar, and the like.

The vehicle speed detector 75 detects a vehicle speed, which is a traveling speed of the vehicle. The vehicle speed detector 75 does not have to use a vehicle speed sensor, and may be configured to detect the vehicle speed by performing calculation using positional data of the global positioning system (GPS). The position information detector 76 detects the current position of the vehicle on the basis of information from map information, the GPS, road-to-vehicle communication, an onboard camera, and the like. The position information detector 76 may use the above-described types of information alone or in combination. In addition, information other than the above-described information may be used.

The voice detector 77 detects a voice emitted by an occupant. The notification device 80 includes: a display device 81, which is a display or the like; and a speaker 82, and notifies the driver of various types of information.

In the present embodiment, since the pedal lever 20 can be locked by the lock mechanism 50, it is possible to make the pedal lever 20 function as a footrest by locking the pedal 20 in the cruise control for keeping the drive speed constant, for example. In a case where the cruise control mode is used in an urban area, there are many cases where a pedal operation is required according to a surrounding traffic situation such an acceleration operation from deceleration as compared with the case of traveling on a limited highway. Therefore, when the pedal lever 20 is made to function as a footrest in the cruise control mode in a situation, for example, in an urban area, where the pedal often needs to be operated, the number of releasing operations of the footrest state increases, and an increasing burden of operation can be placed on the driver.

To address this issue, in the present embodiment, the pedal is allowed to be locked and function as a footrest on the basis of position information of the vehicle when the automatic driving such as a cruise control or the like is performed in an area where there are not many chances to stop the pedal lever 20.

A locking operation control process of the present embodiment will be described with reference to the flowchart of FIG. 4. This process is performed by the ECU 60 at a predetermined cycle. Hereinafter, the term "step" such as step S101 is omitted, and is simply written as the symbol "S".

In S101, the ECU 60 determines whether the current travel mode is the automatic driving mode. In this step, it is considered that the override mode is not the automatic driving mode. In the override mode, the automatic driving is temporarily canceled by, for example, an operation of the pedal lever 20 or the brake pedal, and an operation by the driver is reflected to the driving. If the driving mode is determined not to be the automatic driving mode (S101: NO), the process proceeds to S109. If the driving mode is determined to be the automatic driving mode (S101: YES), the process proceeds to S102.

In S102, the information acquisition unit 62 acquires the position information related to the current travel position of the vehicle from the position information detector 76. Map information, positioning information from GSP, information by road-to-vehicle communication such as DSRC (Dedicated Short Range Communications), information from an in-vehicle camera, etc. are used to acquire the position information, but other information may also be used.

In S103, the locking operation determination unit 64 determines whether or not the vehicle is traveling on the limited highway. The limited highway here includes a so-called expressway, and means a road on which pedestrians and light vehicles do not pass or cross. Further, in the present embodiment, the limited highway corresponds to an example of a "specific position."

For example, when a position information acquisition unit is a communication unit for performing road-to-vehicle communication, it is possible to determine that the vehicle is traveling on a limited highway (i.e., motorway) by detecting that the vehicle has passed an ETC gate. Further, for example, when the position information acquisition unit is an in-vehicle camera, it is possible to determine that the vehicle is traveling on a limited highway by recognizing a sign peculiar to a limited highway. If it is determined that the vehicle is not traveling on the limited highway (S103: NO), the process proceeds to S109. When it is determined that the vehicle is traveling on the limited highway (S103: YES), the process proceeds to S104.

In S104, the locking operation determination unit 64 determines whether the pedal lever 20 is in a locked state. When it is determined that the pedal lever 20 is in the locked state (S104: YES), the processes of S105 and the following steps are skipped. If the pedal lever 20 is determined not to be in the locked state (S104: NO), the process proceeds to S105.

In step S105, the notification control unit 67 issues, via the notification device 80, a notification for prompting a determination whether to activate the lock of the pedal lever 20 or not. In S106, the locking operation determination unit 64 determines whether the driver has selected a lock activation or not. If a lock activation is not selected (S106: NO), the processes of S107 and the following steps are skipped. If a lock activation is selected (S106: YES), the process proceeds to S107.

In S107, the actuator control unit 65 drives the motor 41 to lock the pedal lever 20. In S108, the notification control unit 67 notifies the driver of the information that the pedal lever 20 is locked via the notification device 80.

When a negative determination is made in S101 or S103, the process proceeds to S109. In S109, the locking operation determination unit 64 determines whether the pedal lever 20 is in a locked state. When it is determined that the pedal lever 20 is not in the locked state (S109: NO), the processes of S110 and the following steps are skipped. If the pedal lever 20 is determined to be in a locked state (S109: YES), the process proceeds to S110.

In S110, the actuator control unit 65 drives the motor 41 to unlock the pedal lever 20. In S111, the notification control unit 67 notifies the driver of the information indicating that the pedal lever 20 has got unlocked, via the notification device 80.

The locking operation control process of the present embodiment will be described with reference to the time charts of FIGS. 5 and 6.

Figure 5:
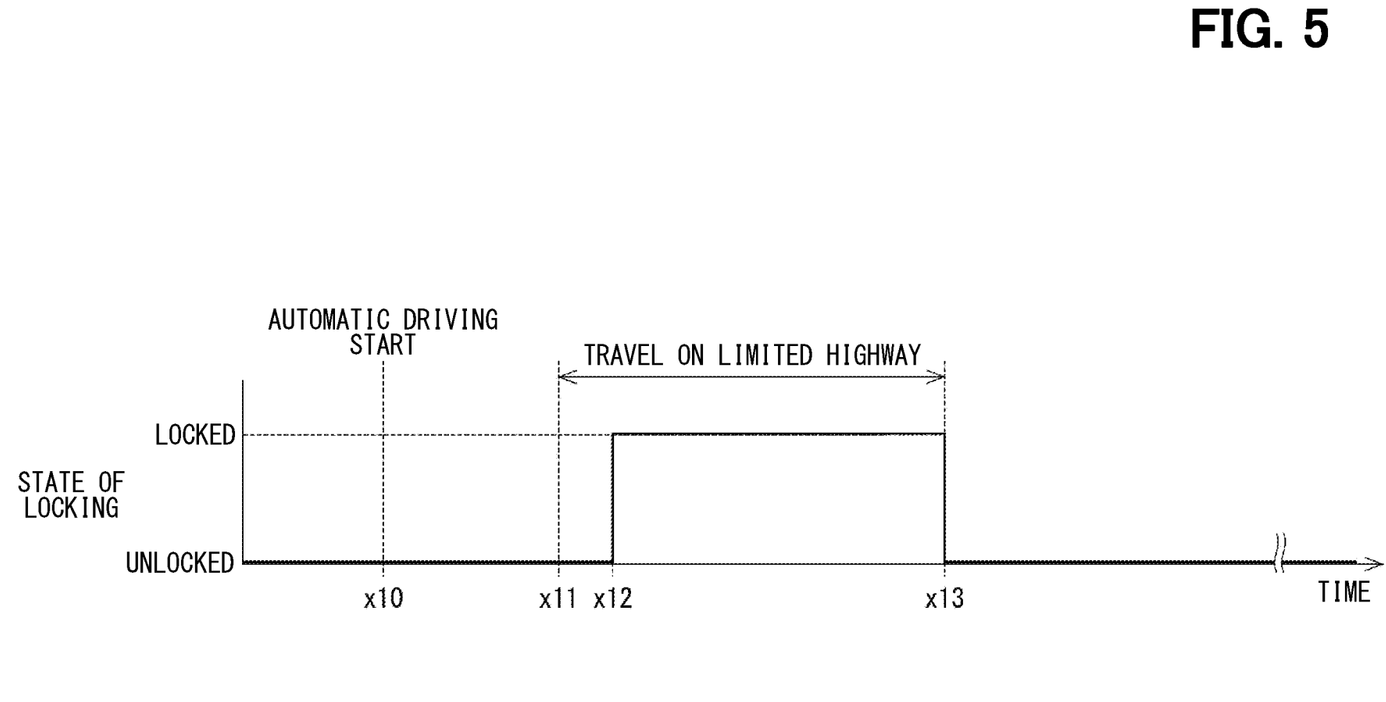
FIG. 5 is a time chart describing the locking operation control process according to the first embodiment.

As shown in FIG. 5, when the automatic driving is started at time x10, if the travel position of the vehicle is not on the limited highway, lock activation for locking the pedal lever 20 will not be performed, and the unlocked state is maintained.

When the vehicle enters the limited highway at time x11, the driver is notified to confirm an intention to activate the lock, and when the driver's intention to activate the lock is input at time x12, the motor 41 is driven to lock the pedal lever 20. When the vehicle exits from the limited highway at time x13, the pedal lever 20 is unlocked and the driver is notified of the information that the lock has been released.

Figure 6:
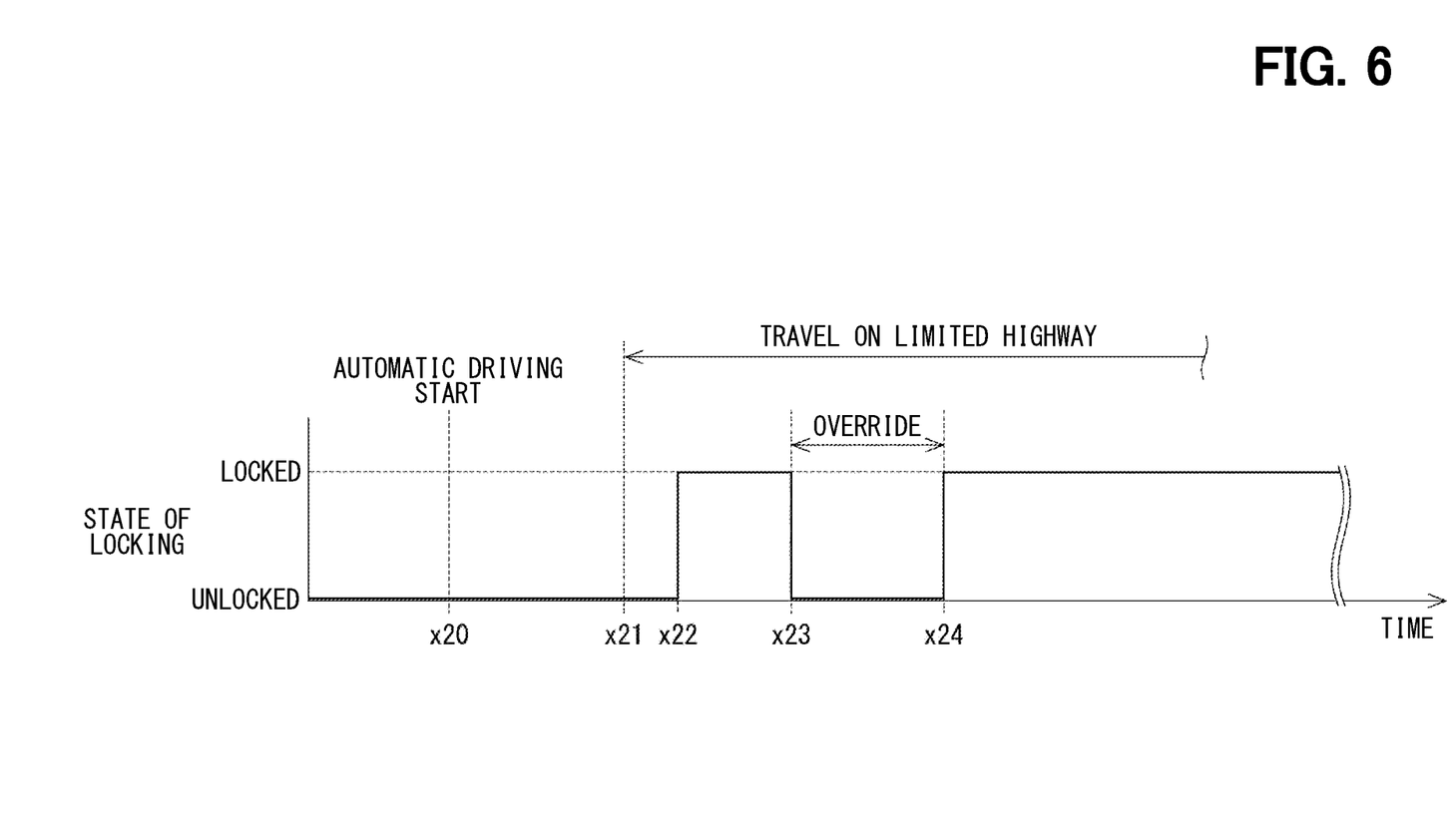
FIG. 6 is a time chart describing the locking operation control process according to the first embodiment.

In FIG. 6, the processing from time x20 to time x22 is the same as the processing from time x10 to x12 in FIG. 5. When the pedal lever 20 is stepped on by the driver at time x23, the locked state is released by the pedaling force. At such time, since the travel mode becomes the override mode, the lock-releasing state (i.e., unlocked state) is maintained. Further, the override mode can be set by an operation other than the pedaling force of the pedal lever 20 (for example, a steering wheel manipulation or a turn signal operation), and the motor 41 is driven to release the locked state in the override mode.

When the override mode ends at time x24, the pedal lever 20 is locked again because the vehicle is traveling on a specific position. In the example of FIG. 6, the pedal lever 20 is locked at the end of the override. However, the pedal lever 20 may be locked after the driver's intention is confirmed, similarly to that at times x21 to x22. Further, at time x21, the pedal lever 20 may be locked immediately without confirming the driver's intention.

As described above, the accelerator pedal system 1 of the present embodiment includes the pedal lever 20, the lock mechanism 50, the actuator 40, and the ECU 60. The pedal lever 20 operates in accordance with a step-on operation. The operation of the pedal lever 20 can be restricted by the lock mechanism 50. Here, the expression "the operation of the pedal lever can be restricted" is not limited to setting the movement amount to 0 by completely fixing the pedal lever 20, but is a concept including setting the movement amount to be smaller than that in the unlocked state. The actuator 40 switches between a locked state in which the operation of the pedal lever 20 is restricted by the lock mechanism 50 and an unlocked state in which the operation is not restricted.

The ECU 60 includes the locking operation determination unit 64, the actuator control unit 65, and the information acquisition unit 62. The locking operation determination unit 64 determines switching of the locking operation by the lock mechanism 50. The actuator control unit 65 controls driving of the actuator 40 in accordance with the determination result of the locking operation determination unit 64. In the present embodiment, the driving of the motor 41 is mainly controlled. The information acquisition unit 62 acquires the position information of the vehicle.

The locking operation determination unit 64 locks the pedal lever 20 when the vehicle is traveling on a specific position in the automatic driving mode. The specific position is a position area where there are few opportunities for acceleration/deceleration operation by the pedal lever 20, and is a limited highway in the present embodiment, for example. In other words, even in the cruise control mode, locking of the pedal lever 20 is not allowed on a general road where an acceleration/deceleration operation opportunity is likely to occur due to overriding.

Thereby, the locked state of the pedal lever 20 can be appropriately controlled. Specifically, since it is possible to reduce the frequency of lock activation and unlock operations during the driving operation by the driver, it is possible to reduce the operation load of the driver.

The ECU 60 includes the notification control unit 67 that causes the notification device 80 to notify that the pedal lever 20 has got locked. This enables the driver to know the state of locking of the pedal lever 20, so that the driver's psychological insecurity can be reduced.

Second Embodiment

Figure 7:
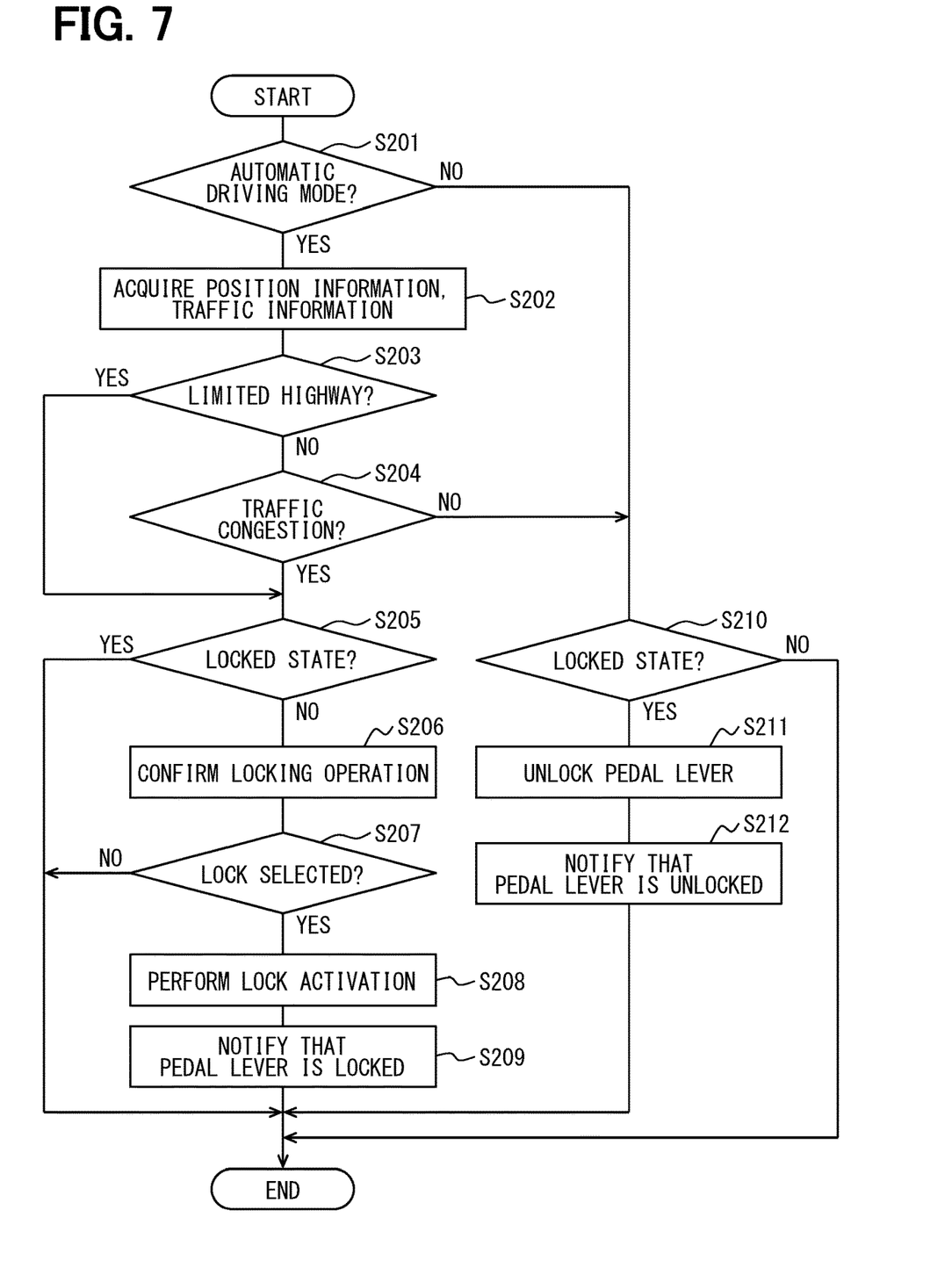
FIG. 7 is a flowchart describing the locking operation control process according to a second embodiment.

The second embodiment will be described with reference to FIG. 7. In the second embodiment, the locking operation control process is different from the above-described first embodiment, and the different point will be mainly described.

The locking operation control process of the present embodiment will be described with reference to the flowchart of FIG. 7. The process of S201 is the same as the process of S101 in FIG. 4.

In S202, the information acquisition unit 62 acquires the position information and traffic information related to the current travel position of the vehicle. The process of S203 is the same as that of S103 in FIG. 4, and, when it is determined that the vehicle is traveling on the limited highway (S203: YES), the process proceeds to S205. When it is determined that the vehicle is not traveling on the limited highway (S203: NO), the process proceeds to S204.

In S204, the locking operation determination unit 64 determines whether or not the position where the vehicle is traveling is in a traffic congestion. If it is determined that the vehicle is in the traffic congestion (S204: YES), the process proceeds to S205. If it is determined that the vehicle is not in the traffic congestion (S204: NO), the process proceeds to S210.

Figure 4:
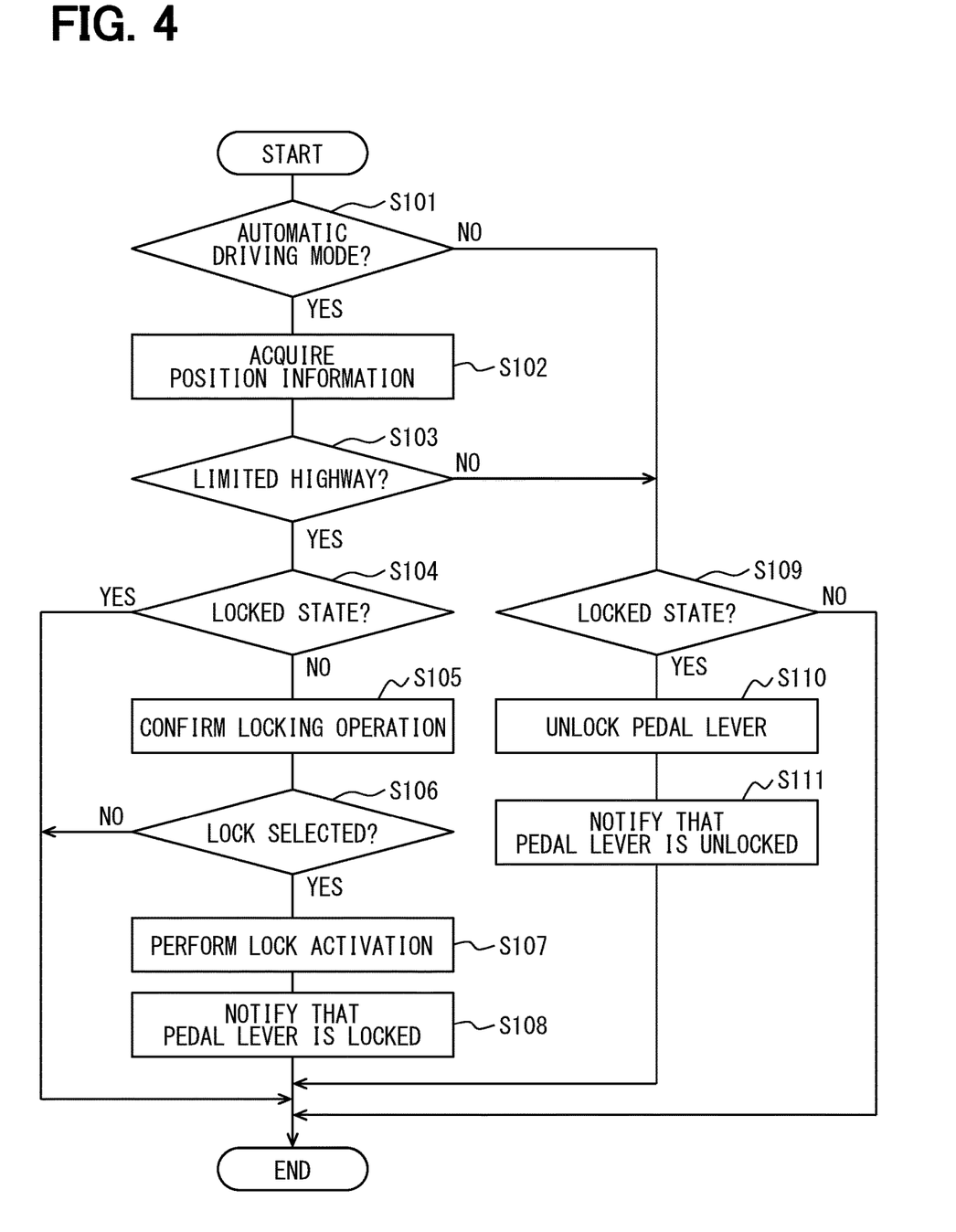
FIG. 4 is a flowchart describing a locking operation control process according to the first embodiment.

The respective processes of S205 to S212 are the same as the respective processes of S104 to S111 in FIG. 4.

In the present embodiment, when (i) the vehicle is traveling on a position where a traffic congestion is occurring, and, (ii) a follow-up control or the like (i.e., to automatically follow a lead vehicle) is performed, there is little chance that the driver needs to operate the pedal, thereby such a position is considered as a specific position. In the specific position, by locking the pedal lever 20, the pedal lever 20 is made as a footrest.

In the present embodiment, the specific position is a position area where a traffic congestion is occurring. That is, the pedal lever 20 is locked (i) when the road is a local road but it is congested and (ii) when there are few chances to operate the pedal lever 20 due to, for example, a follow-up control. In such manner, the locked state of the pedal lever 20 can be appropriately controlled. Further, the same effects as the above-described embodiment are achievable.

Other Embodiments

In the above embodiments, the locking member 51 is provided on a fixed side (i.e., as a fixed member), and the locked portion 52 is provided on a movable side (i.e., as a movable member). In other embodiments, the locking member may be provided on a movable side, and the locked portion may be provided on a fixed side. In the above embodiments, the locked portion is formed as a projection. In other embodiments, the locked portion may be formed as a recess. One of the locked portion and the locking member does not have to be provided on a spur gear, and may be provided on a member that constitutes the power transmission mechanism other than a spur gear.

In the above embodiments, the locking member is provided to be movable in a linear direction along the axial direction of the resilient member, which is a compression coil spring. In other embodiments, the locked state and the unlocked state may be switched by a rotation of the locking member. When the state of locking is switched by a rotation of the locking member, it is possible to prevent or reduce uneven wear of an abutting portion. In other embodiments, the resilient member does not have to be a compression coil spring, and may be a torsion spring, for example. Alternatively, the locking member itself may be formed of an elastic member such as rubber, and may be elastically deformed to switch the state of locking.

In addition, the power transmission mechanism and the lock mechanism may be different from those in the above embodiments. Further, the shapes of the locking member and the locked portion may be different from those in the above embodiments, depending on component layout or the like. In the above embodiments, one actuator is used to apply a reaction force to the pedal lever and to activate a locking operation. In other embodiments, an actuator for applying a reaction force and an actuator for a locking operation may be separately provided as two actuators.

In the above embodiments, the lock mechanism can hold the locked state in a non-energized state in which energization of the motor is turned off. In other embodiments, the lock mechanism may be configured to maintain the locked state by continuously energizing the motor.

In the above embodiments, the pedal lever is locked at the fully closed position by the lock mechanism. In other embodiments, the pedal lever may be locked at the fully opened position or may be locked at an intermediate position between the fully closed position and the fully opened position. Further, the pedal lever may be configured to be capable of being locked in a stepwise manner at a plurality of positions.

In the above embodiments, the limited highway or/and the road in a traffic congestion are defined as "specific positions". In other embodiments, the pedal lever may be locked by setting a specific position other than the above where chances of the pedal operation are low.

In the above embodiments, notification to the driver is performed at the time of lock activation and the time of lock releasing. In other embodiments, at least one of the notification at the time of lock activation and the notification at the time of lock releasing may be omitted. Further, the presence/absence of notification may be changed according to the situation, such as notifying when the lock is activated immediately after the start of automatic operation and not when the lock is activated at the end of override during automatic operation. The same applies to whether to confirm or not to confirm the driver's intention related to lock activation and lock releasing.

A control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the above embodiment, and various modifications may be implemented without departing from the spirit of the present disclosure.

What is claimed is:

1. An accelerator pedal system comprising:
a pedal lever configured to perform an operation in accordance with a step-on operation;
a lock mechanism configured to be capable of restricting the operation of the pedal lever;
an actuator configured to switch between a locked state in which the operation of the pedal lever is restricted by the lock mechanism and an unlocked state in which the operation of the pedal lever is free from restriction by the lock mechanism; and
a controller including
a locking operation determination unit configured to determine switching of a locking operation by the lock mechanism,
an actuator control unit configured to control a driving operation of the actuator, and
an information acquisition unit configured to acquire position information of the vehicle, wherein the controller determines whether the vehicle is traveling on a specific position based on the position information of the vehicle acquired by the information acquisition unit, the locking operation determination unit locks the pedal lever when the vehicle is traveling on the specific position in an automatic driving mode, and the locking operation determination unit does not lock the pedal lever when the vehicle is traveling out of the specific position in the automatic driving mode.

2. The accelerator pedal system of claim 1, wherein the specific position is a limited highway.

3. The accelerator pedal system of claim 1, wherein the specific position is a position area where a traffic congestion is occurring.

4. The accelerator pedal system of claim 1, further comprising:
a notification control unit configured to cause a notification device to notify that the pedal lever is locked.

5. The accelerator pedal system according to claim 1, wherein
the controller is configured to set the automatic driving mode, a manual driving mode or an override mode, as a driving mode of the vehicle,
in the override mode, both an input from an automatic driving control and an input from the step-on operation of a driver are input, and the input by the step-on operation of the driver is always prioritized, and
the locking operation determination unit releases the locked state when the driving mode of the vehicle is switched from the automatic driving mode to the override mode.

6. An accelerator pedal system comprising:
a pedal lever configured to perform an operation in accordance with a step-on operation;
a lock mechanism configured to be capable of restricting the operation of the pedal lever;
an actuator configured to switch between a locked state in which the operation of the pedal lever is restricted by the lock mechanism and an unlocked state in which the operation of the pedal lever is free from restriction by the lock mechanism; and
a controller including at least one processor configured
to determine switching of a locking operation by the lock mechanism,
to control a driving operation of the actuator, and
to acquire position information of the vehicle, wherein
the controller determines whether the vehicle is traveling on a specific position based on the acquired position information of the vehicle,
the controller causes the actuator to set the locked state of the pedal lever when the vehicle is traveling on a limited highway or a position area where a traffic congestion is occurring; and
the controller does not lock the pedal lever when the vehicle is traveling out of the specific position in the automatic driving mode.

7. The accelerator pedal system according to claim 6, wherein
the controller is configured to set the automatic driving mode, a manual driving mode or an override mode, as a driving mode of the vehicle,
in the override mode, both an input from an automatic driving control and an input from the step-on operation of a driver are input, and the input by the step-on operation of the driver is always prioritized, and
the locking operation determination unit releases the locked state when the driving mode of the vehicle is switched from the automatic driving mode to the override mode.

\* \* \* \* \*